(12) United States Patent
Woods et al.

(10) Patent No.: US 7,209,320 B1
(45) Date of Patent: Apr. 24, 2007

(54) OFFSET ANGLE DISC CLAMP

(75) Inventors: Jim L. Woods, Arvada, CO (US); Wayne G. Soderfelt, Westminster, CO (US)

(73) Assignee: Excelstor Technology, Inc., Longmont, CO (US)

( * ) Notice: Subject to any disclaimer, the term of this patent is extended or adjusted under 35 U.S.C. 154(b) by 490 days.

(21) Appl. No.: 10/758,741

(22) Filed: Jan. 16, 2004

(51) Int. Cl.
*G11B 17/022* (2006.01)
(52) U.S. Cl. .................................. 360/99.12
(58) Field of Classification Search ........... 360/99.12, 360/97.02, 98.08, 99.05
See application file for complete search history.

(56) References Cited

U.S. PATENT DOCUMENTS

| | | | |
|---|---|---|---|
| 5,452,157 A | 9/1995 | Chow et al. | |
| 5,517,376 A * | 5/1996 | Green | 360/98.08 |
| 5,555,144 A | 9/1996 | Wood et al. | |
| 5,615,067 A | 3/1997 | Jabbari et al. | |
| 5,940,244 A * | 8/1999 | Canlas et al. | 360/98.08 |
| 5,982,581 A | 11/1999 | Kazmierczak et al. | |
| 6,028,739 A * | 2/2000 | Lindrose | 360/99.12 |
| 6,370,100 B2 | 4/2002 | Koshino et al. | |
| 6,414,817 B1 | 7/2002 | Luo et al. | |
| 6,462,902 B1 | 10/2002 | Luo et al. | |
| 6,462,903 B1 | 10/2002 | Yamada et al. | |
| 6,483,661 B1 * | 11/2002 | Martin et al. | 360/99.12 |
| 6,603,636 B2 * | 8/2003 | Schwandt et al. | 360/99.12 |
| 6,785,090 B2 * | 8/2004 | Koyanagi et al. | 360/98.08 |
| 7,002,774 B2 * | 2/2006 | Adams | 360/97.02 |
| 2001/0017835 A1 | 8/2001 | Koshino et al. | |
| 2003/0095497 A1 | 5/2003 | Myrtle | |

* cited by examiner

*Primary Examiner*—Tianjie Chen
(74) *Attorney, Agent, or Firm*—Rick Martin; Patent Law Office of Rick Martin, P.C.

(57) ABSTRACT

A disc assembly in a disc drive includes a hub rotatable about a central axis. Pluralities of disc elements are mounted about outer periphery of the central axis of the hub. An annular shaped disc clamp is located about a first axial end of the hub, the annular shaped clamp holding the outermost disc to the hub by a series of equally spaced fasteners along an inner diameter of the disc clamp. The improvement therein consisting of placing an offset angle on the underside, or disc-to-hub contact area. The offset angle sloping from the inner disc contact point outward to the end of the clamp such that application of pressure during clamping will make a uniform contact area along the clamp surface as the clamp fasteners are tightened to secure the clamp to the hub. This improves flatness, axial run out, reduces repeatable run out and increases reliability.

8 Claims, 8 Drawing Sheets

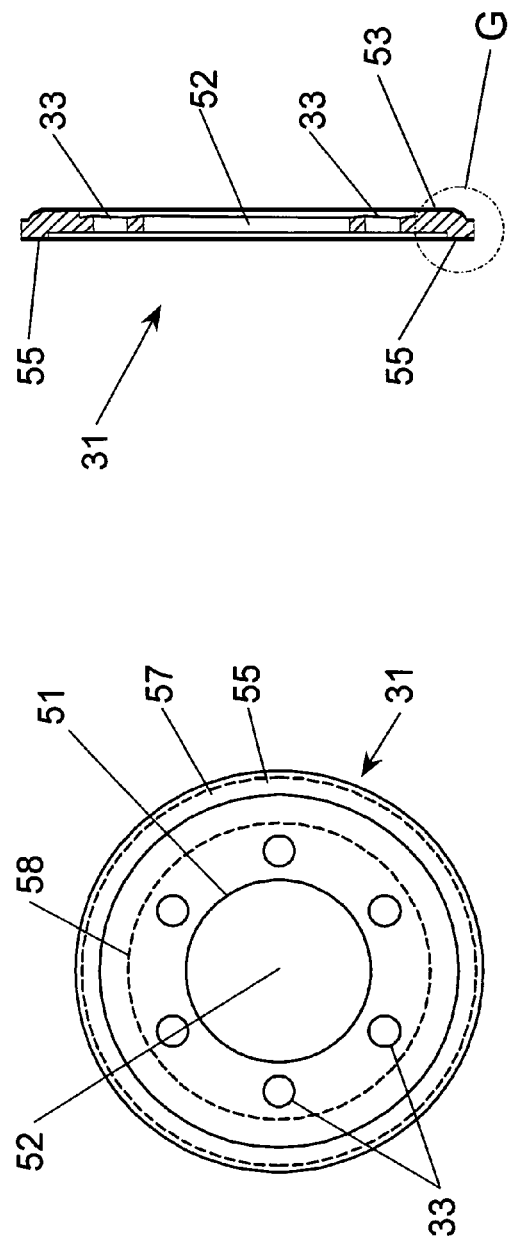

OFFSET ANGLE DISC CLAMP

FIELD OF THE INVENTION

The present invention relates generally to an apparatus and improvements in such apparatus for fastening of rotating circular plates, and, more particularly, to clamping improvements to prevent a disc from being warped due to the force associated with disc clamping.

BACKGROUND OF THE INVENTION

The present invention deals with disc drives. A typical disc drive includes one or more magnetic discs, which are mounted on a hub or spindle. When a plurality of discs are to be mounted on a hub, the discs are separated along the axial direction of the hub by spacers mounted between the discs. The disc, or plurality of discs, are mounted on a flange portion of the hub by a clamp apparatus. The clamping is such that the disc(s) rotate with the hub about the radial center axis of the hub. The primary method of disc clamps in prior art results in a vertical force point contact about a circumference point on the disc. This point contact can add additional warping to the disc itself.

A typical disc assembly will also include a transducer(s) that is supported by an air bearing which flies above the surface of each disc. The transducer and air bearing are typically referred to as the read/write (R/W) head. A drive controller controls the disc drive movement to allow retrieval of information from the magnetic disc (or writing of data to the disc). An electromechanical actuator operates to move the data head radially over the disc surface for track seek operations and holds the transducer directly over a track for R/W operations.

Modern high performance disc drives employ head positional servo loops. The function of the head positioning servo system within the drive is to position the read/write head over a data track with sufficient accuracy to enable reading and writing of that track without error and to position the write element with sufficient accuracy not to encroach upon adjacent tracks to prevent data erosion from those tracks during writing operations to the track being followed. In order to satisfy these requirements, the tracking system must be designed to reject disturbances. These disturbances include noise from sources such as spindle bearings, air turbulence, etc., and can be classified into two general categories, those that generate repeatable runout (RRO) and those that generate non-repeatable runout (NRRO). The term "repeatable" is used to describe periodicity on a revolution-by-revolution basis as opposed to a track-by-track basis. The response of the head positioning servo system to the RRO and NRRO sources is track miss-registration (TMR).

Embedded servo systems derive head position information from servo information interspersed within the data blocks written on a surface of a rotating magnetic disc. One advantage of employing embedded servo information is that the same head and electronics are used to read both user data and head position information. One of the major sources of RRO is the servo write process that occurs during disc drive manufacturing. The NRRO disturbance (bearing noise, air turbulence, servo writer vibration, etc.,) that occurs during servo write is essentially frozen into the written position information and becomes the RRO for the particular track.

It is known with a disc drive how to extract and correct for RRO. Embedded servo fields are recorded on disc surfaces and are used by a servo controller in accurately aligning a read/write head over a desired track.

Disc assemblies typically have air filtration systems to expunge any air borne particles at start up. Air passing through a filter will carry any minute matter into the filter to avoid disc contamination by such particles.

U.S. Pat. No. 4,885,652 dated Dec. 5, 1989 to Leonard et. al titled 'Disk Cartridge' provides an air filter and ribs incorporated into the inner surface of the cartridge, which induce the air in the cartridge to flow toward the air filters. When the disc is rotated at high speed within the cartridge, airflow induced by disc rotation is directed toward the air filters by the ribs adjacent to the outer circumference of the disc it also is employed between the disc and filter and induces internal airflow generated by rotation of the disc toward the air filter(s). The present invention will address ways of improving air flow in a hard disc device.

Clamping of the disc on the hub is done prior to derivation of the embedded servo information. Improper clamping can add to creation of additional disc warping along an annular track. Additional warping can cause the air bearing to have an inconsistent flying height above the surface of each disc effecting the head pick-up amplification. This is commonly referred to as axial run out. Point contact clamping apparatus can also affect non-operational shock tolerance of the disc assembly. Clamping that causes additional warping of the disc will also effect RRO and track squeeze. As disc drives become smaller, there is a tendency for the discs to warp into a potato chip type shape due to the required clamping force of the disc clamp to prevent any 'disc slippage'. Typical warping may be somewhat sinusoidal extending outward from the point of each fastener contact. Thus, a combination of annular point contact and fastener contact will distort the flatness of a disc in a non-uniform manner. All manufactured disc drives have drop specifications, which are a force expressed in g's. All of these factors necessitate an improvement in disc clamping.

The present invention addresses these and other problems, and offers other advantages over the prior art by improvements in a disc clamp apparatus.

SUMMARY OF THE INVENTION

The main aspect of the present invention is an improvement in the distribution of clamp-to-disc vertical holding force over a set area.

Another aspect of the present invention is to reduce disc slip.

Another aspect of the present invention is to decrease warping of the disc caused by clamping.

Another aspect of the present invention is to enhance R/W head flying height consistency, thus improving data transfer reliability and axial run out.

Another aspect of the present invention is to improve the non-operational shock tolerance of the disc assembly.

Yet another aspect of the present invention is to improve the RRO of the disc assembly.

Still another aspect of the present invention is to reduce any track squeeze due to warping of the disc.

Another aspect of the present invention is to utilize elevated ribs (or grooves) on the base housing to direct air flow towards a filter.

The present invention consists of an offset angle disc clamp apparatus that employs an outer annular, flanged contact surface with an angular offset on its clamp-to-disc contact surface. The angular contact surface extends radially inward at the clamp-to-disc contact surface at an angle of about 3° such that the outmost radial contact surface is in initial contact with the disc prior to applying torque to the clamp-to-hub fasteners. The offset angle clamp provides a disc-to-clamp interface angled (tilted) edge such that application of torque on the clamp-to-hub fasteners will result in the initial angular offset surface moving into a parallel contact surface position with the disc as torque is applied, thus resulting in an even distribution of the clamp-to-disc force.

The embodiment of the present invention provides an offset angular disc clamp comprising:
- an annular clamp characterized by further comprising an outermost annular surface with an angular offset of about 3° extending inward towards the clamp radial center;
- means for fastening said clamp to a disc assembly hub with a clamp to disc fastener(s);
- an inner annular opening positioned axially about its center such to allow alignment with the hub; and
- means for applying a predetermined vertical force on the clamping fasteners.

The present invention also employs raised ribs to enhance airflow induced by disc rotation, directing airflow toward the air filters by the ribs, which is located beyond the outer circumference of the disc. The result of such ribs providing a faster clean out time for any latent particles is allowing for a faster start-up time.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 5a is a bottom view of the offset angle disc clamp of the present invention.

FIG. 5b is a side cross sectional view of the offset angle disc clamp of the present invention.

FIG. 5c is a cross sectional blow up of cutout G of FIG. 5b.

Figure 1:
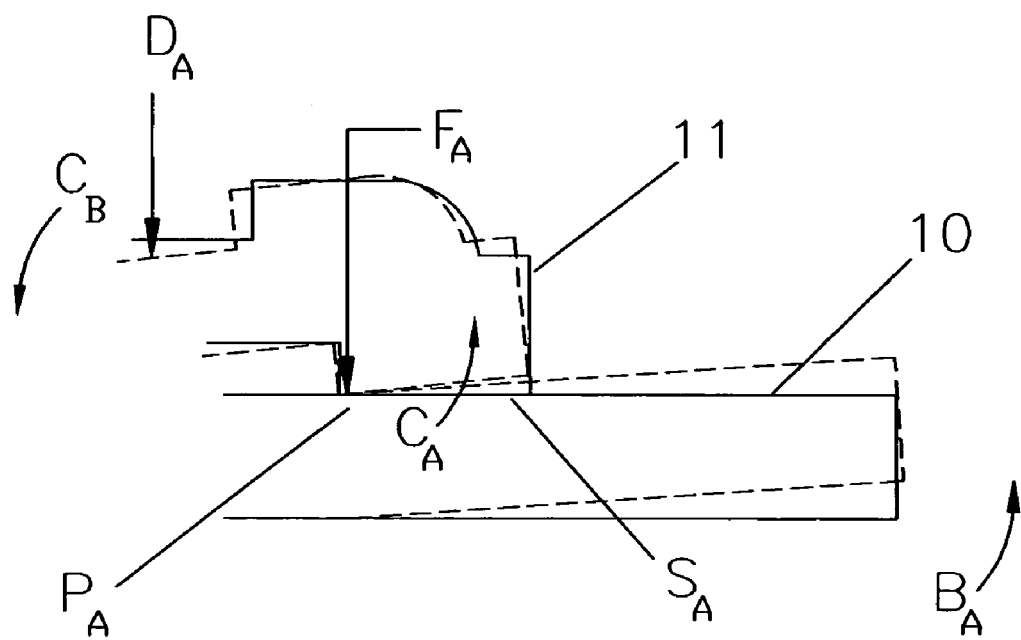
FIG. 1 is an illustrative cross sectional side view drawing of a clamp to disc contact area (prior art).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF INVENTION

The present invention provides an offset angle disc clamp, which is an improvement in the distribution of clamp-to-disc vertical holding force. An even distribution of the vertical holding force over a set area will reduce any disc slip. This even distribution allows improved ability of the disc assembly to withstand drop force. An even distribution of vertical holding force will also decrease warping of the disc caused by the clamping mechanism itself by avoiding an annular point-contact force. Reduced warping will enhance R/W head flying height consistency (or axial run out), thus improving data transfer reliability. A reduction in head movement while reading a track (axial run out) minimizes head movement in a vertical direction with respect to the disc surface. Reduction in axial run out will improve the signal to noise ratio of the head pickup mechanism and provide for consistent signal amplitude.

The even distribution of vertical holding force is accomplished by applying an offset angle to the annular peripheral contact surface of the clamp-to-disc surface. With the offset angle, prior to applying torque to the fasteners, only a point contact will be made at the outer peripheral surface of the offset angle disc clamp to disc surface. As the fasteners, which attach to the offset angle disc clamp to the hub, have torque applied, the outer peripheral surface will gradually move from a peripheral point contact to a distributed surface area contact. Initial measurements via use of surface flatness measurement equipment such as supplied by Zygo™ Corp. were performed to optimize both the offset angle and torque requirements. These measurements were done to compare disc surface flatness of various prior art clamping mechanisms including the clamping with zero offset angle versus use of an offset angle on the clamp peripheral annular surface. Initial measurement results showed that using an approximate 3° offset angle at the peripheral annular surface of the disc along with approximately 4 inch-pounds at each of six fasteners resulted in greater than a 2.5× improvement in surface flatness distortion over prior art clamping mechanisms. For example, typical distortion without an offset angle showed disc surface flatness in the range of about 600 to 650 micro-inches due to clamping, whereas utilization of the offset angle disc clamp of the present invention resulted in surface flatness in a range of about 200–250 micro-inches. One important factor is that the present invention not only improves surface flatness but also made it more uniform. That is, single annular tracks were basically flat. The disc flatness uniformly moved from inner to outer tracks, as does a surface of a nearly perfect conical shape. Prior art clamping resulted in flatness distortion within each single track(s). This results in significant improvements in axial distortion. Drop force tolerances also improved from about 250 g's to about 300 g's of force. In the preferred embodiment of the present invention an outer diameter of the hub is in the range of about 1.250" with the peripheral annular surface extending in towards the hub central axis to an inner diameter of about 1.100". Thus the annular contact surface area of the offset angle clamp-to-disc is about 0.150" wide for a contact area of about 0.277 in$^2$. Thus, the annular contact surface is a peripheral contact surface having a length along a radius from the center of the hub. That length (or straight line segment) in the preferred embodiment is about 0.150". The segment starts from an inner to an outer contact edge along the radius of the hub. Carbon paper was used at the contact area interface to measure and insure even force distribution in determining the optimized torque with the 3° offset angle. Although the preferred embodiment of the present invention provides for six clamp to disc fastener points, other designs can easily be incorporated. Also, for example, three of the six fastener points may be incorporated or an alternate embodiment can employ a disc clamp with a plurality of fasteners other than six. It should also be noted that although an offset angle of about 3° is utilized as the preferred embodiment of the present invention, other offset angles could be used along with other torque and/or fastener requirements.

As aforementioned, it should be noted that prior art disc clamps resulted in inconsistent flatness measurements from an inner track to an outer track and that flatness along a track was not constant. Flatness along an annular track using prior art clamping methods was somewhat sinusoidal or random contributing to axial run out. Measurements taken with the offset angle clamp of the present invention shows that it maintains a uniform flatness along a track, thus minimizing axial run out. Not only does the present invention offset angle clamp result in consistent flatness along a track but also it minimizes flatness changes as the head moves from an inner to outer track on a disc. The resulting profile is a cone shape from the inner to the outer track. Flatness along a radial arm extending from inner to outer tracks was measured to be a uniform change with a maximum change of about 150 micro-inches.

In reducing total disc flatness (or warp) due to disc clamping, the RRO and NRRO of the disc assembly is also improved along with reduction of track squeeze. Track squeeze is defined as the track width becoming smaller in relation to the pickup head due to its warp.

The present invention also employs one or more raised rib surface(s) on the base plate (or housing) assembly. The raised rib(s) form a groove(s) and function to move airflow towards an air filter mounted on the base plate outward of the disc itself. The directed airflow can reduce start-up time of the disc by providing a quicker clean up time to trap any random particles within the base plate assembly. The rib(s) (or raised grooves) direct air flow to the filter buy providing a raised groove for about 180° in a radial direction and having the groove curved in an outward radial direction, stopping prior to the filter location. Thus air flow is moved in an outward direction to the filter as it moves in an annular-like path around and within the base assembly.

Referring now to the drawings, FIG. 1 is an illustrative cross sectional side view of a clamp to disc contact area (prior art). Disc 10 has a flat surface and clamp 11 is in contact with disc at clamp outer surface $S_A$ prior to any fastener torque and resulting clamp force $D_A$ applied by a fastener (not shown). Application of fastener torque and clamp force $D_A$ to an inner fastener area of the clamp will result an outer area clamp force $F_A$ applied as the clamp is distorted in a downward direction $C_B$ on its inner area. Outer clamp surface $S_A$ will be caused to lift in direction $C_A$ and the resulting effect will be a point contact $P_A$ at the clamp to disc interface. Point contact $P_A$ will cause disc 10 to warp in an upward direction $B_A$. It should also be noted that the disc would not only warp in a radial direction but also in an annular direction (ref. FIG. 4). Each fastener contact point will cause a 'wave like' warping of disc 10, resulting in an uneven flatness along a single annular track.

Figure 2:
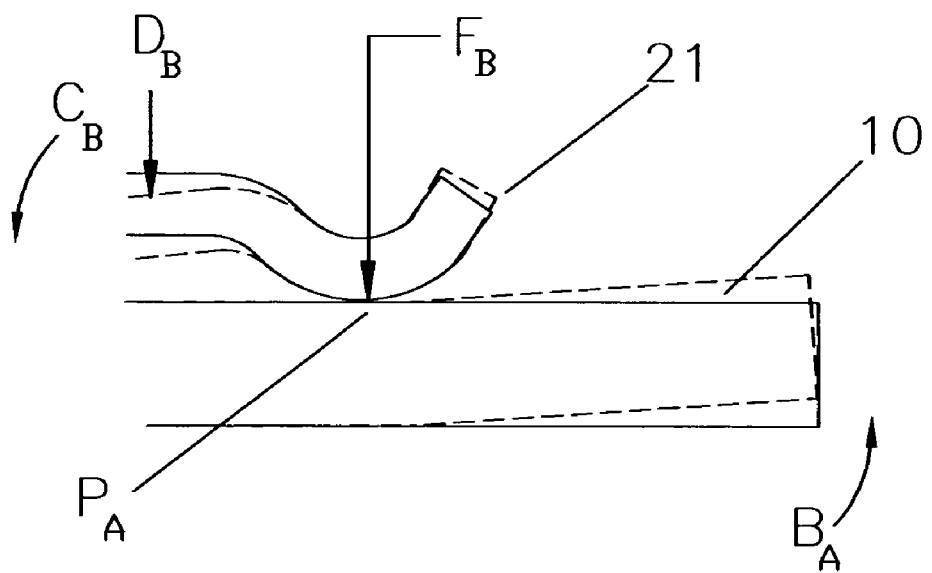
FIG. 2 is an illustrative cross sectional side view drawing of a spring clamp to disc contact area (prior art).

FIG. 2 is an illustrative cross sectional side view of a spring clamp to disc contact area (prior art). Disc 10 has a flat surface and clamp 21 is in contact with disc at spring clamp surface $P_A$. Fastener torque and resulting clamp force $D_B$ is then applied by a fastener (not shown) to clamp the disc to a hub. Application of clamp force $D_B$ will result in downward spring clamp force $F_B$ as the inner area of the spring clamp is distorted in downward direction $C_B$. Downward spring clamp force $F_B$ and inner fastener (not shown) will cause the outer area of disc 10 to lift in direction $B_A$ and will cause disc 10 to warp in an upward direction $B_A$. Again, as discussed in FIG. 1, each fastener contact point will cause a 'wave like' warping of disc 10 (ref. FIG. 4), resulting in an uneven flatness along a single annular track.

Figure 3A:
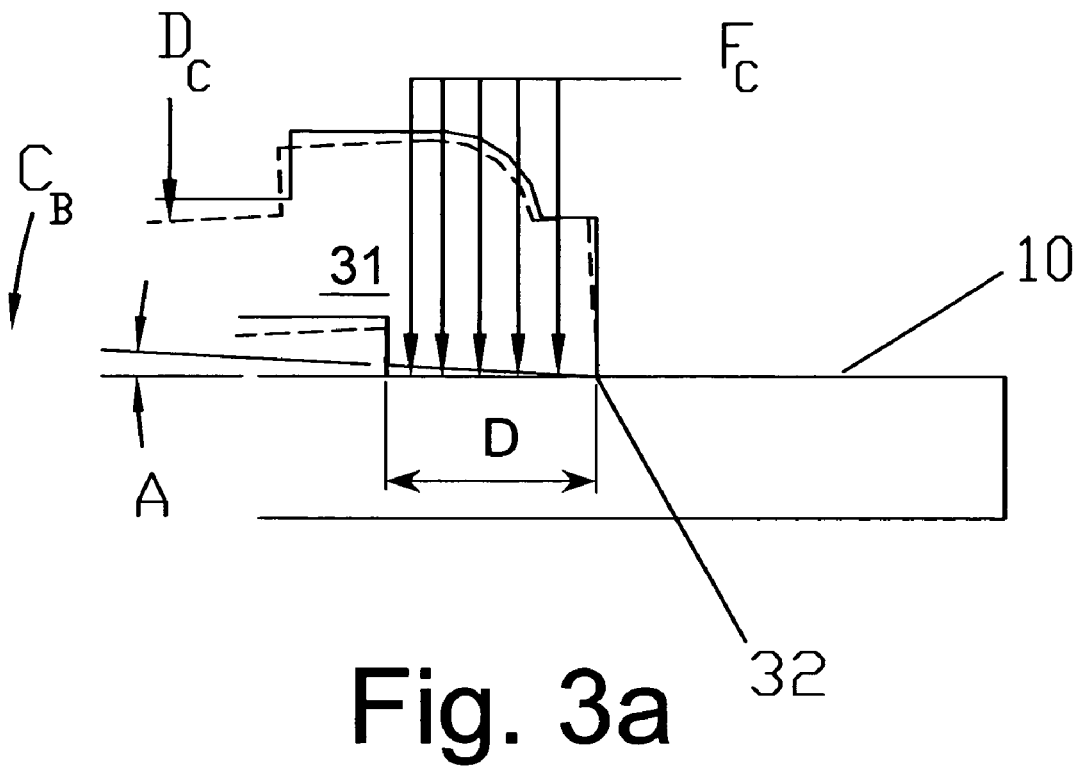
FIG. 3a is an illustrative cross sectional drawing of the angular offset of the offset disc clamp to disc contact area of the present invention.

FIG. 3a is an illustrative cross sectional drawing of the angular offset of the angular offset disc clamp 31 to disc 10 area of the present invention. Initially the outer surface of disc clamp 31 is in point contact 32 with disc 10 and an angular offset A of about 3° allows angular offset disc clamp 31 to be in contact at only one point contact 32 prior to applying torque to any fastener. As fastener clamping torque force $D_C$ is applied, inner downward clamp motion $C_B$ occurs on clamp 31. As this motion occurs, angular offset A decreases from 3° to 0° offset (dashed line) and point contact 32 changes to form a uniform contact area with an evenly distributed clamping force $F_C$ applied to the clamp-to-disc surface. The clamping force $F_c$ is distributed along the entire contact area. The contact area has a radial length (or segment) D along a radius from the center of the hub that starts from the inner contact edge of clamp 31 to the outer edge of clamp 31, the outer edge having initial point contact 32. This will result in a uniform flatness along the outer annular disc clamping area. It will also result in an even distribution of flatness from inner to outer disc tracks. The resulting disc shape, using the offset angle clamp, will be conical from innermost to outermost disc track. Because each track is flat within itself, axial run out is virtually eliminated in reading of a track.

Figure 3B:
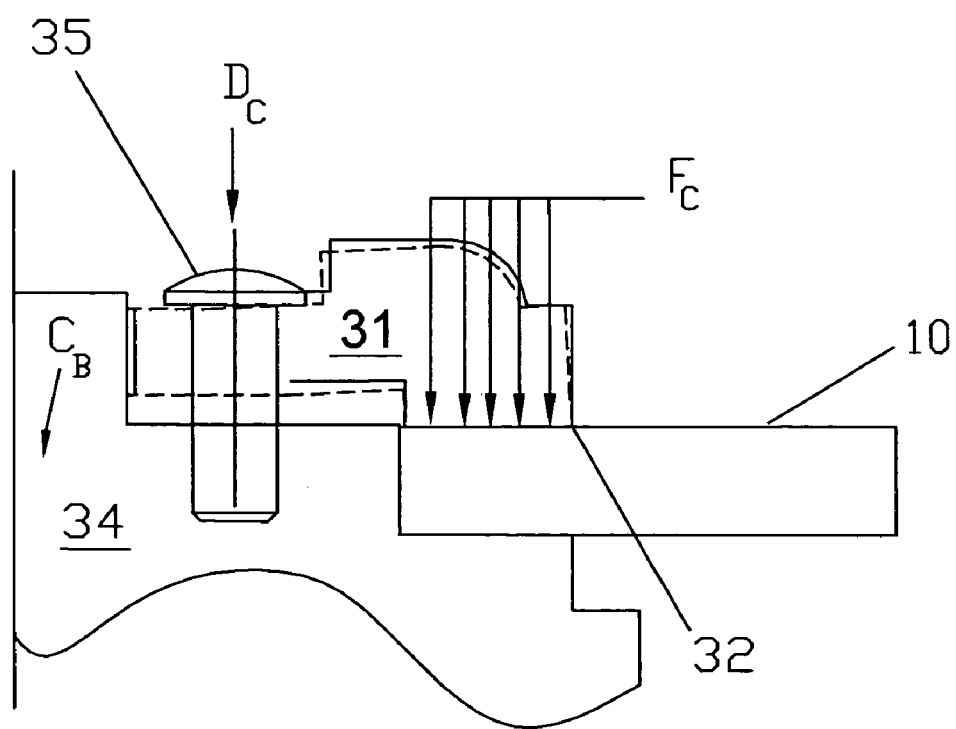
FIG. 3b is an illustrative cross sectional drawing depicting the angular offset of the clamp to disc area of the present invention, also showing a disc to hub fastener.

FIG. 3b is an illustrative cross sectional drawing depicting the angular offset of the clamp 31 to disc 10 area of the present invention, also showing a disc to hub fastener 35. FIG. 3b is an extended cross sectional view of FIG. 3a. As previously stated, initially the outer surface of disc clamp 31 is in point contact 32 with disc 10 and an angular offset A (ref. FIG. 3a) of about 3° allows angular offset disc clamp 31 to be in contact at only one point contact 32 prior to applying torque force $D_c$ to fastener 35. As fastener clamping torque force $D_C$ is applied via tightening fastener 35, inner downward clamp motion $C_B$ occurs on disc clamp 31. As this motion occurs, the angular offset decreases (ref. FIG. 3a) from 3° to 0° offset and point contact 32 reforms to a uniform contact area with an evenly distributed clamping force $F_C$ applied to the clamp-to-disc surface. This will result in disc clamp 31 having a uniform flatness along the single clamp to disc contact area. It will also result in an even distribution of flatness from inner to outer disc tracks with an evenly distributed clamping force $F_c$. The resulting disc shape, using the offset angle clamp, will be conical from innermost to outermost track. Because each track is flat within itself, axial run out is virtually eliminated in reading of a track.

Figure 4A:
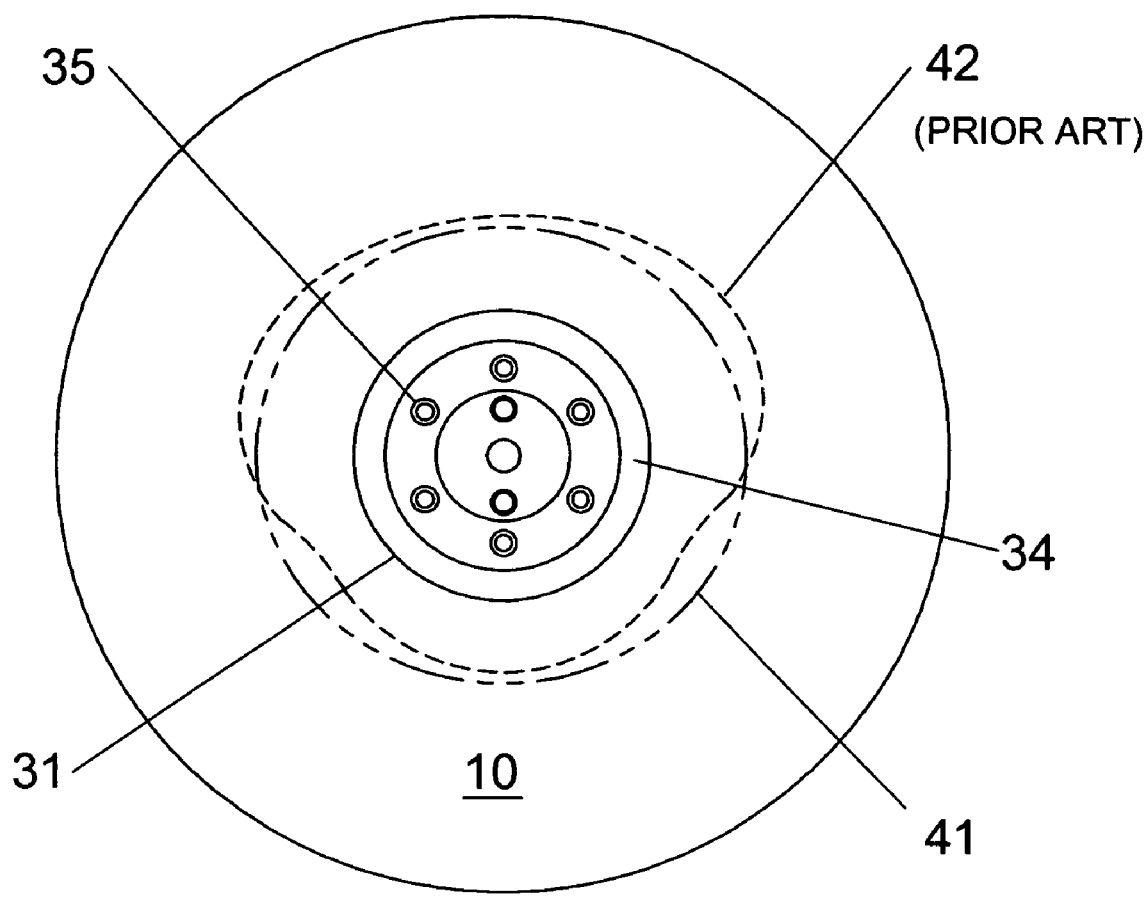
FIG. 4a is a top view showing an annular disc track flatness curve comparing prior art to the present invention.

FIG. 4a is a top view showing an annular disc track flatness curve comparing prior art to the present invention. Disc clamp 31 having a uniform distribution of clamping force (ref. $F_c$ FIG. 3a) results in annular storage track 41 having a uniform flatness curve about disc 10 as represented by the circular shape. The use of prior art clamping (ref.

FIGS. 1,2) would result in non-uniform flatness track 42 about disc 10. Torque applied to fastener(s) 35 aggravates the non-uniform flatness around a track and from an inner to outer track. Flatness would also be non-uniform from one track to another. It should be noted that although only one storage track is shown, disc clamp 31 of the present invention results in each track being flat about the center of disc 10 such that disc 10 will be conical from its innermost to outermost disc track.

Figure 4B:
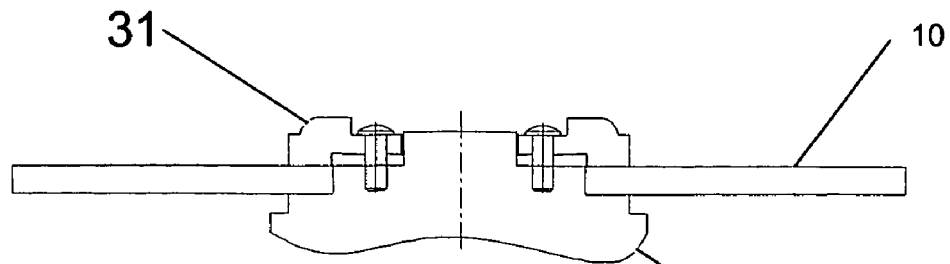
FIG. 4b is a side cross sectional view of a disc with clamp prior to any clamping force being applied.

FIG. 4b is a side cross sectional view of disc 10 with clamp 31 prior to any clamping force being applied. In this situation disc 10 has no stress applied to its surface and remains perfectly horizontal in its shape.

Figure 4C:
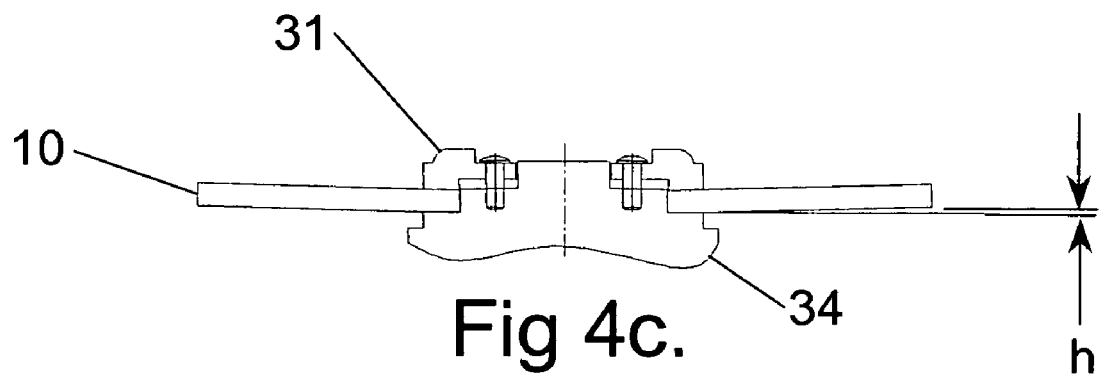
FIG. 4c is a side cross sectional view a disc with the offset angle disc clamp of the present invention after a force is applied.

FIG. 4c is a side cross sectional view disc 10 with offset angle disc clamp 31 of the present invention after a force is applied. In this case the disc has a small amount of distortion but the distortion is in a conical shape about the clamp and the flatness across the surface extends to an offset flatness h which has been measured to be in the range of about 200–250 micro-inches. Thus each single annular tracks basically flat (ref. FIG. 4a) and disc flatness uniformly moves from the inner to outer tracks, as does a surface of a nearly perfect conical shape.

Figure 4D:
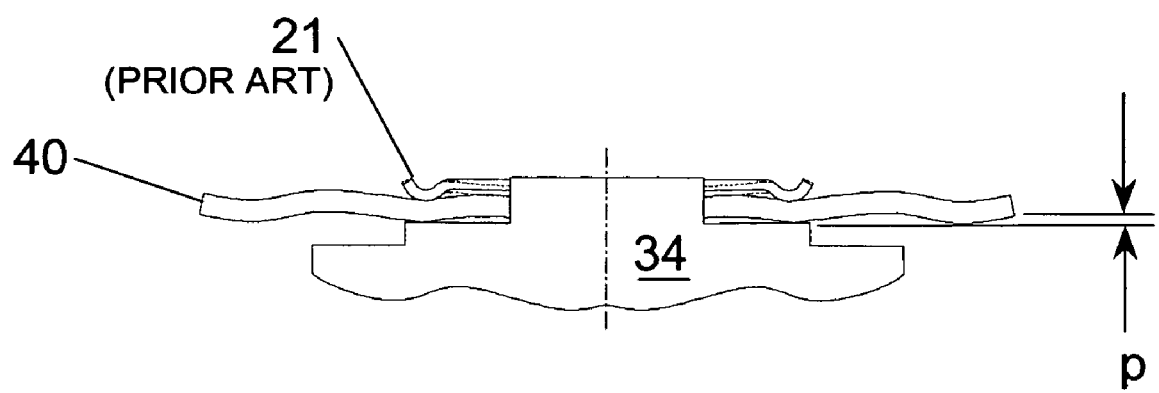
FIG. 4d is a side cross sectional view of a disc with a prior art clamping mechanism.

FIG. 4d is a side cross sectional view of disc 40 with a prior art clamping mechanism 11. The disc surface offset flatness p has been measured to be in the range of about 600 to 650 micro-inches due to clamping versus the present invention (ref. FIG. 4c) resulted in surface offset flatness in a range of about 200–250 micro-inches. It should also be noticed that the disc shape is somewhat 'taco' shaped which results in a non-uniform flatness track (ref. FIG. 4a) within each single disc track.

FIG. 5a is a bottom view of the offset angle disc clamp 31 of the present invention. An inner clamp cutout starts at surface radial point 51, which allows offset angle disc clamp 31 to centrally mount on a hub motor (not shown) with the hub motor mounted through inner clamp cutout hole 52. Offset angle disc clamp to motor hub fasteners (not shown) mount through fastener holes 33 and function to secure offset angle disc clamp 31 to the motor hub. Clamp-to-disc contact surface 55 is on the bottom surface and forms the uniform contact area as discussed in FIGS. 3a, 3b. Oval radial ridge surface 57 is on the top surface and is used for manufacturing purposes only. Counter bore offset radial ridge point 58 is the start of a counter bore at the top surface which extends from offset radial ridge point 58 to cutout radial point 51 forming a counter bore in the center section of the clamp which also is a manufacturing function.

FIG. 5b is a side cross sectional view of the offset angle disc clamp 31 of the present invention. Clamp-to-disc offset contact surface 55 forms the uniform contact area with a disc surface. Cutout fastener holes 33 are for disc to hub motor clamping fasteners. Inner offset angle disc clamp hole 52 allows the motor hub to accept proper clamp centering. Clamp-to-disc offset contact surface 55 has the offset angle of about 3° (see cutout G, FIG. 5c) at its outer boundary. Top surface 59 is essentially flat.

FIG. 5c is a cross sectional blow up of cutout G of FIG. 5b. Angular offset angle A extends through clamp-to-disc offset contact surface 55 and has an angle of about 3° extending inward from outer clamp surface 61. The offset angle A decreases from 3° to 0° offset moving outer annular offset contact surface 55 to form a distributed contact with disc surface 56 as clamping force is applied to the fasteners (not shown). This will result in uniform disc flatness along the annular offset contact surface 55. Offset contact surface 55 extends for a segment length D and extends from an inner to an outer contact edge along a radial segment of the hub. In the preferred embodiment of the present invention, segment length D is about 0.150". Also shown in FIG. 5c is radial ridge 57 on the top clamp surface, which is used for manufacturing purposes. Edge surface 60 and top surface 59 are both essentially flat horizontal surfaces.

Figure 6:
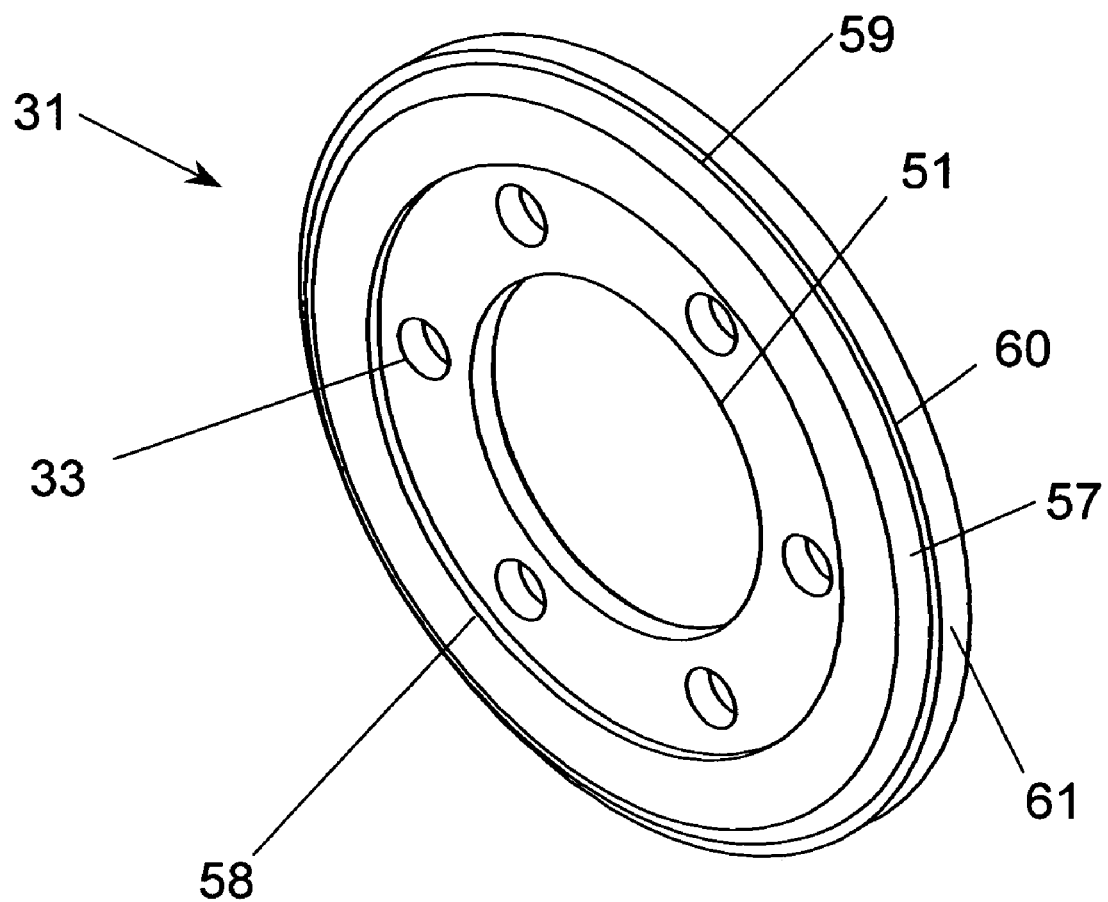
FIG. 6 is a top perspective view of the offset angle disc clamp of the present invention.

FIG. 6 is a top perspective view of the offset angle disc clamp 31 of the present invention. Outer clamp surface 61 is essentially vertical and contacts with the outer offset contact surface 55 (ref. FIGS. 5a, 5b, 5c). Edge surface 60 is essentially a horizontal flat surface. Radial ridge 57 is an oval shaped ridge between flat edge surface 60 and top surface 59. The oval shaped ridge is non-functional and is for manufacturing purposes. The area between edge of top surface 58 and inner diameter radial point 51 is basically a flat counter bore area. Fastener holes 33 are also shown.

Figure 7:
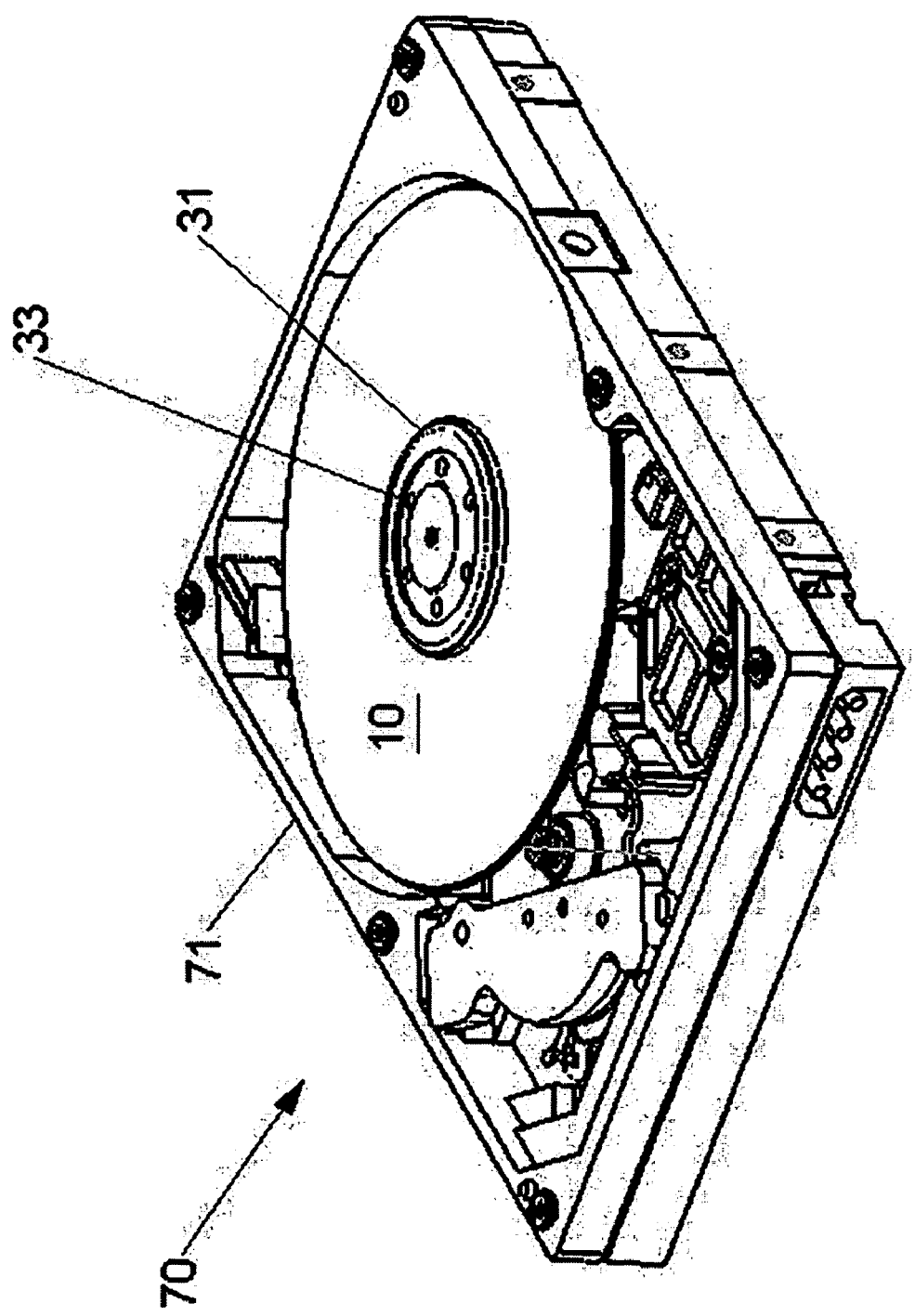
FIG. 7 is a perspective drawing of a disc sub-assembly.

FIG. 7 is a perspective drawing of disc sub-assembly 70. Base plate 71 is typically a cast aluminum housing which holds all electronics, discs, motors, R/W heads, air filters, actuator assemblies, etc. Offset angle clamp 31 is shown holding disc 10 in place within base plate 71. Offset angle clamp 31 is shown with a total of six fastening holes 33. It should be noted that although six fastening holes are depicted, the present invention could also employ other embodiments with another quantity of fastening holes, or, other embodiments which would used only a partial number of fasteners. For example, three fasteners could be employed in the six holes shown.

Figure 8:
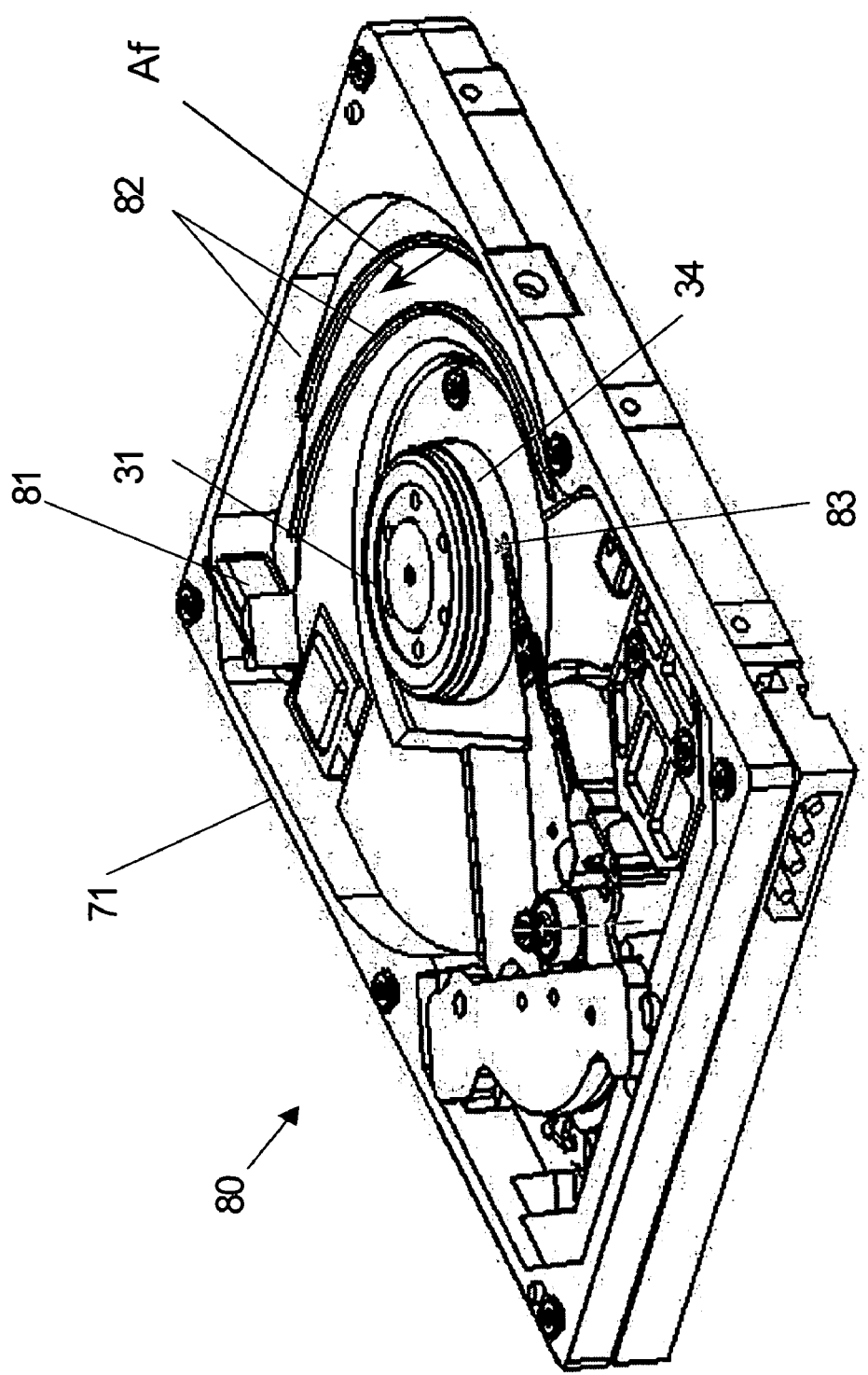
FIG. 8 is a perspective drawing of a disc sub-assembly without the disc(s) in place showing raised ribs to move air flow towards a filter.

FIG. 8 is a perspective drawing of a partial disc sub-assembly 80 without the disc(s) in place showing raised ribs 82 to move airflow in direction $A_F$ towards air filter 81. Airflow is created by rotation of the disc (not shown). Raised ribs 82 are set into base assembly 71. Although two raised ribs are shown on the base plate (or housing) assembly other embodiments could employ one or more to direct air. Raised ribs 82 form grooves and function to move airflow in direction $A_F$ towards air filter 81 mounted on base plate 71 outward of the disc area. Grooves 82 providing directed airflow $A_F$ reduce start-up time of the disc drive by providing a quicker clean up time to trap any random particles within base plate assembly 80. Raised ribs 82 extend for about 180° in a radial direction towards air filter 81 with a form curved in an outward radial direction, stopping prior to the filter location. Thus air flow is moved from inward to an outward direction to the filter as it moves in an annular-like path around and within the base assembly. Also shown are R/W head 83 and motor hub 34 to which clamp 31 attaches disc(s), which are not shown.

Although the present invention has been described with reference to preferred embodiments, numerous modifications and variations can be made and still the result will come within the scope of the invention. No limitation with respect to the specific embodiments disclosed herein is intended or should be inferred.

We claim:

1. In a rotating disc drive assembly having a powered hub, which rotates a flat, annular disc, a clamp being used to fasten the disc to the powered hub via connecting fasteners, an improvement comprising:

said clamp having a generally annular shape with a peripheral contact surface which faces downward against an upper surface of the disc;

said peripheral contact surface having a straight line segment along a radius from a center of the hub;

said straight line segment starting from an inner edge to an outer edge of the peripheral contact surface;

said straight line segment further comprising a taper starting from the outer edge upward toward the inner edge; and wherein when the fastener is fastened a force emanating from the fastener outbound to the outer edge of the peripheral contact surface causes the clamp to distort downward from the inner edge to the outer edge of the peripheral contact surface so as to force the inner edge in contact with the upper surface of the disc, thereby distributing the downward force on the fastener along an entire length of the straight line segment.

2. The apparatus of claim 1, wherein the straight line segment taper is constant along the entire peripheral contact surface.

3. The apparatus of claim 2, wherein the taper is about three degrees.

4. The clamp from claim 1, wherein the disc is contained within a disc base assembly which further contains one or more raised ribs incorporated onto the inner surface of the disc base, thereby directing circulating air towards a filter.

5. A clamp comprising:

a round, disc shaped body having an outer, round peripheral edge;

said body having a central hole to mate to a hub;

said body having a lower surface with a clamp to disc contact surface;

said clamp to disc contact surface further comprising a peripheral edge and an inner edge;

said clamp to disc contact surface having a straight line segment along a radius from a center of the hub to the peripheral edge;

said straight line segment having an incline angle starting at the peripheral edge and extending upward to the inner edge of the clamp to disc contact surface; and wherein when the clamp is fastened by a fastener through the clamp into a hub, a force will emanate from the fastener outbound to the peripheral edge of the clamp to disc contact surface, wherein the force causes the clamp to distort downward from the inner edge to the peripheral edge of the clamp to disc contact surface so as to force the inner edge in contact with an upper surface of a disc, thereby distributing the force on the clamp along an entire length of the straight line segment.

6. The clamp of claim 5, wherein the straight line segment incline angle is continuous along the entire clamp to disc contact surface.

7. The incline angle of claim 6, wherein said incline angle is about three degrees.

8. The clamp of from claim 5, wherein the force causes the straight line segment incline angle to decline to zero degrees.

\* \* \* \* \*